United States Patent [19]

Arnold

[11] Patent Number: 6,095,474
[45] Date of Patent: Aug. 1, 2000

[54] STABILIZING APPARATUS FOR RECREATIONAL VEHICLES AND THE LIKE

[76] Inventor: Wayne I. Arnold, 1645 9th Ave. SE. #291, Albany, Oreg. 97321

[21] Appl. No.: 09/259,670

[22] Filed: Feb. 25, 1999

Related U.S. Application Data

[60] Provisional application No. 60/087,669, Jun. 2, 1998.

[51] Int. Cl.[7] .................................................. F16M 13/00
[52] U.S. Cl. ............................................ 248/352; 280/763.1
[58] Field of Search ................................. 248/352, 354.1,
248/354.3, 354.4, 354.5, 354.6, 354.7; 280/763.1;
254/424, 101

[56] References Cited

U.S. PATENT DOCUMENTS

| | | | |
|---|---|---|---|
| 3,367,614 | 2/1968 | Leonard | 254/101 |
| 3,930,668 | 1/1976 | Schuerman et al. | 280/763.1 |
| 3,933,372 | 1/1976 | Herndon | 280/763.1 |
| 4,596,371 | 6/1986 | Clark | 248/354.3 |
| 4,708,362 | 11/1987 | Raetz | 280/763.1 |
| 4,905,953 | 3/1990 | Wilson | 248/352 |
| 5,474,330 | 12/1995 | Meehleder | 280/763.1 |
| 5,575,492 | 11/1996 | Stone | 280/475 |
| 5,901,980 | 5/1999 | Few et al. | 280/763.1 |

*Primary Examiner*—Ramon O. Ramirez
*Attorney, Agent, or Firm*—Larry D. Johnson

[57] ABSTRACT

Apparatus for stabilizing recreational vehicles and the like while in stationary use, providing increased lateral stability and improved ease and rapidity in installation and removal, comprising two legs pivotally connected to a horizontal support member and extending longitudinally downward therefrom to engage the ground. The legs diverge outwardly with respect to one another and the horizontal axis of the vehicle frame and are connected near their lower ends with means for applying a pulling force from one support member to the other so as to pull the two support members towards one another and to provide tension between the support members and prevent them from separating while in use.

1 Claim, 2 Drawing Sheets

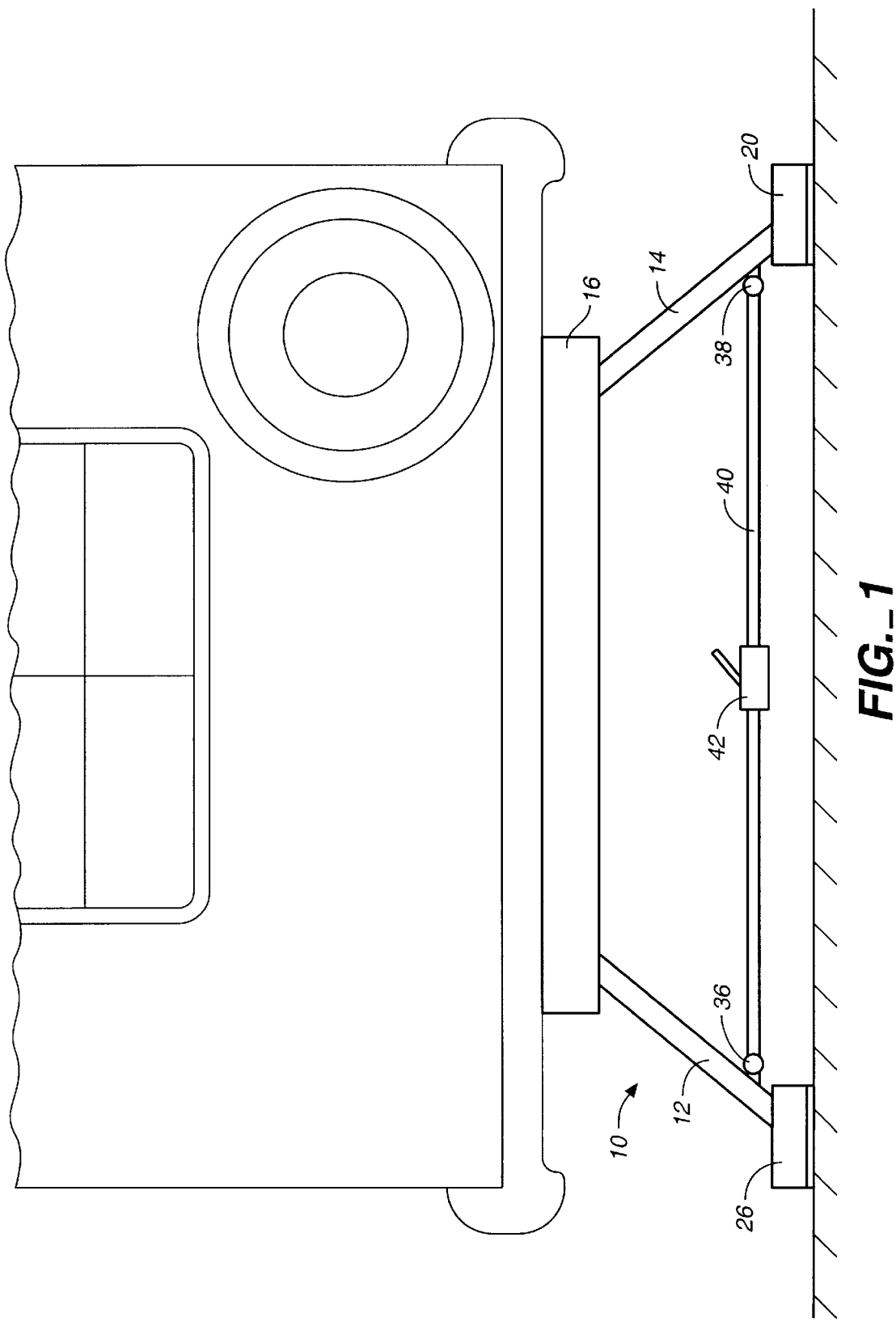
FIG._1

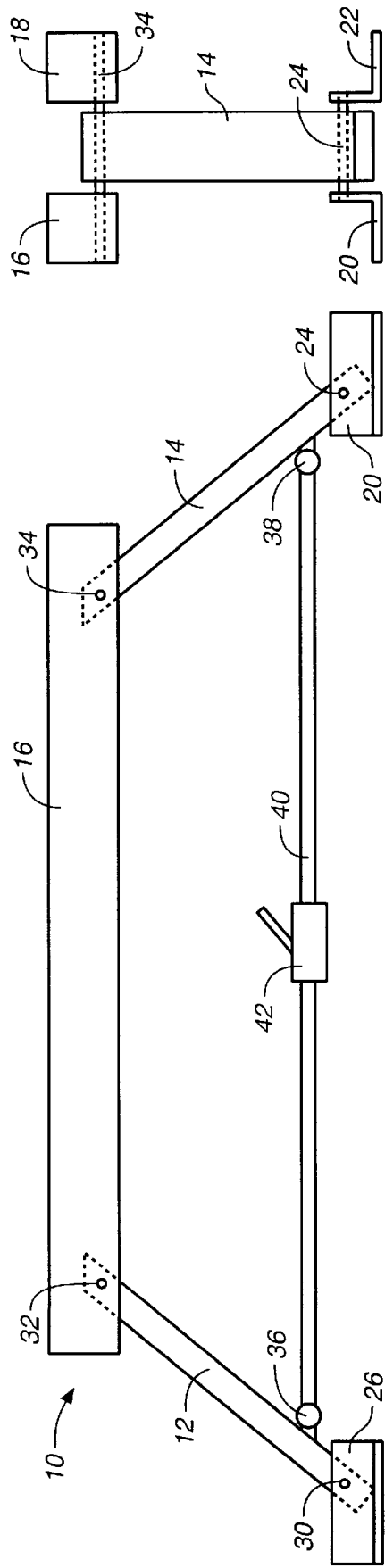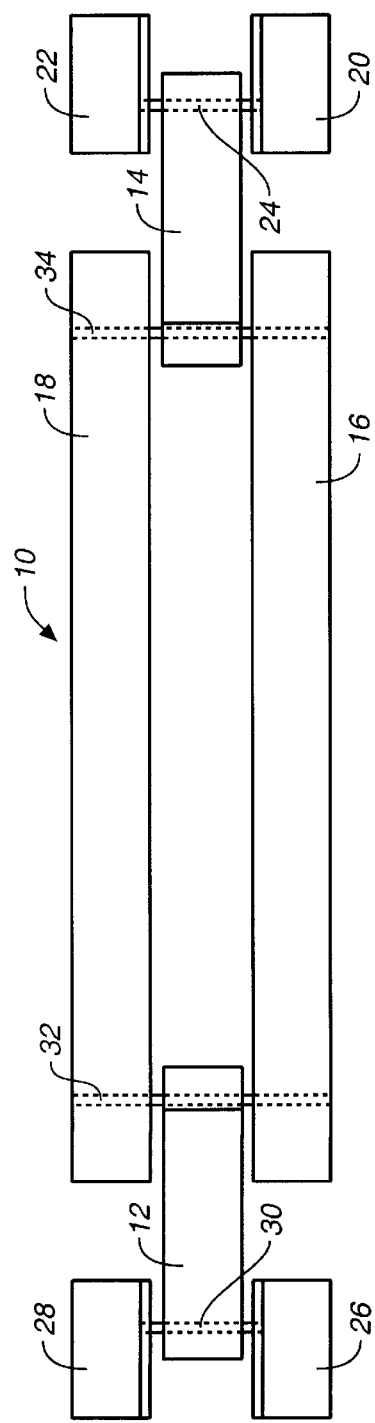

STABILIZING APPARATUS FOR RECREATIONAL VEHICLES AND THE LIKE this application claims benefit of Provisional Appl. 60/087,669 filed Jun. 2, 1998.

BACKGROUND OF THE INVENTION

1. Field of the Invention

The present invention relates generally to a support and stabilizing device for use with stationary recreational vehicles and trailers, and more particularly to an adjustable support and stabilizing device for recreational vehicles and trailers which substantially reduces vehicle movement as occupants move about the vehicle.

2. Brief Description of the Prior Art

Several kinds of recreational vehicles now provide users with a combination of living quarters and means of transportation. However, the suspension systems of fifth wheels, travel trailers, camping trailers, and motor homes, while maximizing safety and handling in transport, only secondarily provide comfort and stability while parked and in use. This is because the suspension systems must allow for a sufficient degree of motion independent of the axle or axles.

Over the years, many systems have been proposed to increase the stability of the living quarters while in stationary use. The most commonly used, corner jacks (either screw jacks, ratchet jacks, or scissor jacks) and vertical support stands, typically attach to or near to the exterior corners of the vehicle and extend directly perpendicular to the ground. The jacks or stands take the vehicle off the suspension system and thus reduce lateral and rocking movements caused by moving occupants. In design and function these systems are essentially identical to the conventional means for jacking up an automobile for changing a tire. However, they fail to provide adequate stability due to their own inherent vulnerability to lateral and forward and rearward forces.

More recent designs involve downwardly diverging lateral supports which connect to the vehicle above the suspension system. The lateral supports are typically connected at some point along their length to prevent them from separating. For example, U.S. Pat. No. 3,933,372 discloses a trailer stabilizing and leveling device comprising two support members pivotally connected to the underside of a trailer. The legs extend to the ground outward in a direction transverse to the longitudinal axis of the trailer and can be raised from the ground into a retracted position by force means which tend to move the legs toward one another and which also maintain the legs in stabilizing and leveling contact with the ground.

U.S. Pat. Nos. 4,596,371 and 5,474,330 each disclose a support and stabilizing device having two elongated legs, at least one of which is extensible longitudinally. Each leg engages the vehicle frame above the suspension system and extends downwardly to the ground and outwardly relative to the other leg. The legs are interconnected at their lower extremity by a restraining member, preferably a chain, that provides tension between the legs and prevents them from separating.

While the known devices with outwardly diverging legs provide increased lateral stability over the jack or stand-type systems, each must either fasten to the underside of the vehicle, or consist of independently moving components and thus require considerable dexterity by one person or, more likely, two persons, to install.

SUMMARY OF THE INVENTION

The present invention provides a device for stabilizing and leveling recreational vehicles and the like while in stationary use. It advances over the prior art in providing increased lateral stability, and improved ease and rapidity in installation and removal.

The stabilizing device of the present invention comprises two legs pivotally connected to two horizontal support members and extending longitudinally downward therefrom to engage the ground. The legs diverge outwardly with respect to one another and the horizontal axis of the vehicle frame and are connected near their lower ends with means for applying a pulling force from one support member to the other so as to pull the two support members towards one another and to provide tension between the support members and prevent them from separating while in use. A preferred means for providing the pulling force between the support members is a strap with a ratchet pulley or winch, which when shortened varies the width of the base defined by the support members and adjusts to variable terrain.

A notable advantage of the present invention is the simplicity with which it is installed, operated and removed. While providing such ease of use, this invention also provides increased lateral stability on uneven or inclined surfaces.

BRIEF DESCRIPTION OF THE DRAWINGS

FIG. 1 is a front elevation view of the stabilizing apparatus of the present invention shown installed and stabilizing a stationary recreational vehicle.

FIG. 2 is a front elevation view of the stabilizing apparatus of the present invention.

FIG. 3 is an end view of the stabilizing device of the present invention.

FIG. 4 is a top view of the present invention.

DETAILED DESCRIPTION OF A PREFERRED EMBODIMENT

Referring to FIG. 1, there is shown a front elevation view of the stabilizing apparatus for recreational vehicles and the like of the present invention. The apparatus 10 comprises a first leg 12 and a second leg 14, each pivotally connected at their upper ends to horizontal support members 16 and 18. The horizontal support members each have a top, bottom, sides, and ends, and have a generally rectangular profile on front elevation and top views, FIGS. 1 and 4.

As shown in FIGS. 1 and 3, the means by which the legs 12 and 14 are pivotally connected to the horizontal support members comprises a bolt, 32 and 34, respectively, which passes transversely through openings in the support member and the horizontal support members 16 and 18 and is secured, preferably, by a nut. Alternatively, the bolt may be secured by a cotter pin or other fastener.

The lower ends of each the legs 12 and 14 are pivotally attached to ground engaging foot members, 20, 22, 26, and 28. The foot members comprise integrally formed vertical and horizontal planes and are rectangular as viewed in front elevation, FIGS. 1 and 2, L-shaped as viewed on end, FIG. 3. Each foot member is pivotally connected to the leg by bolts, 24 and 30 for the first and second leg, respectively, which passes transversely through holes in the vertical plane of the foot members and the lower end of one of the legs.

The legs diverge outwardly with respect to one another and the horizontal axis of the vehicle frame and are connected near their lower ends with means for applying and maintaining a pulling force from one support member to the other so as to pull the two legs towards one another and to provide tension between the legs and prevent them from separating while in use. In the preferred and illustrated embodiment, the means for providing the pulling force between the legs comprises a length of canvas strap 40, connected via eye bolts 36 and 38 to the lower ends of the legs 12 and 14, and threaded through a ratchet pulley 42, which when shortened varies the width of the base defined by the support members and adjusts to variable terrain.

When assembled the present invention comprises a singular unit that is easily lifted and placed underneath the frame of a recreational vehicle or the like. The legs can then easily be pulled manually to the ground (or simply permitted to drop), and the ratchet pulley engaged in the positive direction to pull up any slack in the tension strap. This installation can be accomplished in very little time by only one person with a minimum of movements. As an alternative, the apparatus may be permanently affixed to the underside of the frame members of a recreational vehicle or the like. The installation is removed even more easily than it is installed and folds compactly for storage.

Furthermore, the present invention provides improved lateral stability and ease of installation on uneven and inclined surfaces.

The apparatus of the present invention may be constructed from lightweight aluminum or any other suitable material, such as other metal or alloy. Preferred dimensions may be as follows: 1 inch square aluminum (0.0633 wall thickness) for the legs and horizontal support members. The foot members may be 1.5 inch by 1.5 inch by 6.0 inch angle aluminum (0.125 inch thickness). The foot members are preferably connected and hinged with plated bolts and self-locking nuts. Preferably a one inch strap with a ratchet-type crank or winch is installed between the legs with one eye bolt affixed to each of the respective legs.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A stabilizing apparatus for recreational vehicles and the like for reducing vertical and lateral movement of the vehicle while in stationary use and having a folded and operational configuration, comprising:

a first elongate leg member having front, rear, top, and bottom surfaces, and upper and lower portions, and having apertures passing through the front and rear surfaces of each of the upper and lower portions to receive a bolt;

a second elongate leg member having front, rear, top, and bottom surfaces, and upper and lower portions, and having apertures passing through the front and rear surfaces of each of the upper and lower portions to receive a bolt;

a first elongate horizontal support member having an inner rectangular planar surface, an outer rectangular planar surface, upper and lower rectangular planar surfaces, two square planar ends, and apertures near the distal portion passing through each of the inner and outer planar surfaces for receiving a bolt;

a second elongate horizontal support member having an inner rectangular planar surface opposing the inner planar surface of said first horizontal support member, an outer rectangular planar surface, upper and lower rectangular planar surfaces, two square planar ends, and apertures near the distal portion passing through the inner and outer planer surfaces for receiving a bolt, wherein said upper rectangular planar surface is coplanar with the upper rectangular planar surface of said first elongate horizontal support member;

a first and second bolt with corresponding nut to pivotally affix said first and second leg members to the inside planar surfaces of said first and second horizontal support members at the aperture near the opposite distal portions of each of said horizontal support members such that said first leg member and second leg member are interposed between said first and second horizontal support members, and wherein said horizontal support members are interposed between the upper portions of said first and second elongate leg members, said first bolt passing through the upper portion of said first and leg members and the distal portions of said first and second horizontal support members, said first bolt secured by said first nut, and said second bolt passing through the upper portion of said second leg member and the opposite distal portions of said first and second horizontal support members and secured by said second nut;

a first foot member pivotally connected to said first leg member at the front surface of the lower portion of said first leg member permitting said first leg member to be positioned in a large range of outwardly diverging angular positions relative to said second leg member;

a second foot member pivotally connected to said first leg member at the rear surface of the lower portion of said first leg member permitting said first leg member to be positioned in a large range of outwardly diverging angular positions relative to said second leg member;

a third foot member pivotally connected to said second leg member at the front surface of the lower portion of said second leg member permitting said second leg member to be positioned in a large range of outwardly diverging angular positions relative to said first leg member;

a fourth foot member pivotally connected to said second leg member at the rear surface of the lower portion of said second leg member permitting said second leg member to be positioned in a large range of outwardly diverging angular positions relative to said first leg member;

a canvas strap interposed between and connecting said first and second leg members to one another, so as to apply and maintain a tension between said first and second leg members such that said first and second leg members are placed and fixed in a specific outwardly diverging relationship to one another in the operational configuration;

a ratchet pulley for adjusting the length and tension of said restraining means while in the operational configuration; and first and second eye bolts for attaching said canvas strap to the lower portion of the bottom surface of said first and second leg members.

* * * * *